United States Patent [19]
Wagstaff et al.

[11] Patent Number: 5,822,962
[45] Date of Patent: Oct. 20, 1998

[54] CROP PROCESSOR APPARATUS FOR PULL-TYPE FORAGE HARVESTER

[75] Inventors: Robert A. Wagstaff, Lancaster; Larry D. Hall, New Holland, both of Pa.

[73] Assignee: New Holland North America, Inc., New Holland, Pa.

[21] Appl. No.: 835,063

[22] Filed: Apr. 3, 1997

Related U.S. Application Data

[60] Provisional application No. 60/017,074 Apr. 26, 1996.

[51] Int. Cl.[6] .......................... B02C 18/24; A01D 45/02
[52] U.S. Cl. ........................... 56/16.4 R; 241/101.762
[58] Field of Search ........................ 56/10.8, 12.1, 56/DIG. 1, DIG. 15, 16.4 R, 14.3, 13.3, 13.4; 241/101.762, 222, 60

[56] References Cited

U.S. PATENT DOCUMENTS

| | | | |
|---|---|---|---|
| 3,431,712 | 3/1969 | Probsting | 56/23 |
| 4,345,417 | 8/1982 | duBuhr et al. | 56/14.3 |
| 4,426,043 | 1/1984 | Martenas | 241/101.2 |
| 4,505,434 | 3/1985 | Martenas et al. | 241/89.3 |
| 4,597,253 | 7/1986 | Blumer et al. | 56/13.4 |
| 4,619,410 | 10/1986 | Lenzer et al. | 241/222 X |
| 4,678,129 | 7/1987 | Dallinger | 241/101.7 |
| 4,718,612 | 1/1988 | Zweegers | 241/222 X |

FOREIGN PATENT DOCUMENTS 182033  5/1978  Hungary.

*Primary Examiner*—Thomas B. Will
*Assistant Examiner*—Robert Pezzuto
*Attorney, Agent, or Firm*—Frank A. Seemar; Larry W. Miller; John W. Stader

[57] ABSTRACT

A pull type forage harvester including a header, a cylindrical cutter head having rotating knives operatively associated with a shearbar, feed rolls for receiving crop material from the header and conveying it to the cutterhead, and a blower remotely located on the forage harvester relative to the cutterhead. The blower includes a spout for expelling cut crop material to a collecting receptacle. A transverse conveyor consisting of an auger mounted in a trough receives chopped crop material from the cutterhead and conveys it to the blower. Mounted adjacent the cutterhead is a crop processor for crushing chopped crop material received from the cutterhead. The processor comprises a pair of crushing rolls aligned with the cutterhead axis and above the transverse conveyor.

10 Claims, 5 Drawing Sheets

CROP PROCESSOR APPARATUS FOR PULL-TYPE FORAGE HARVESTER

CROSS REFERENCE TO RELATED APPLICATION

This application claims the benefit of U.S. Provisional application Ser. No. 60/017,074, filed Apr. 26, 1996.

FIELD OF THE INVENTION

The present invention relates generally to forage harvesters and more particularly to a pull-type forage harvester in which a crop processor is incorporated.

BACKGROUND OF THE INVENTION

A typical forage harvester operates in a field to chop windrowed or standing crop material and includes either a self propelled or pull-type base unit with a header attached thereto for cutting or picking up crop material and feeding it rearwardly. The base unit includes a forward generally rectangular inlet opening for receiving crop material from the attachment, a feeding assembly spanning the width of the inlet opening for conveying material into the base unit, a rotating cutterhead for receiving crop material from the feeding assembly and chopping it into appropriate particle sizes. Some units employ a blower for transferring the chopped material up a spout to a vehicle for transporting it from the field, while others utilize the throwing action of the cutterhead to convey the chopped material up a spout.

One commonly known arrangement of pull-type forage harvester apparatus utilizes a transverse auger for conveying chopped material from the cutterhead to a blower. Exemplary structure of this nature is illustrated by the disclosure at FIG. 1 of U.S. Pat. No. 4,426,043, issued Jan. 17, 1984 in the name of Wayne B. Martenas. Another well known example of a pull-type forage harvester employing a transverse auger for conveying crop material from the cutterhead to a blower is disclosed in U.S. Pat. No. 4,505,434, issued Mar. 19, 1985 in the name of Wayne B. Martenas, et al. Insofar as self propelled units are concerned, the most common arrangement conveys material directly from the cutterhead to the blower.

Regardless of the type of unit being used, it is necessary to accommodate a variety of crops, corn being one of the more common types. While chopping corn with a forage harvester of either type referred to above, it is not uncommon for less than half the kernels to be cut or cracked by the cylindrical cutterhead. Due to peculiarities of the digestive system of cattle, the full food value of the feed is not utilized in circumstances where the kernels are uncracked or uncut, regardless of the reason. Accordingly, prior art self propelled forage harvesters have been provided with crop processor assemblies for further cracking and cutting of the kernels to overcome this problem and enhance the nutritional characteristics of the resulting harvester output.

Insofar as known crop processor structure is concerned, it is not unusual to mount paired crushing rolls in the path between the cutterhead and blower of self propelled forage harvester apparatus. An example of structure of this nature is disclosed in U.S. Pat. No. 4,597,253, issued Jul. 1, 1987 in the name of Leo Blumer, et al. Similar structure is shown in U.S. Pat. No. 4,678,129, issued Jul. 7, 1987 in the name of James F. Dallinger. In both the aforementioned patents, the crop processor structure, located below the cutterhead, feeds processed crop material to a blower having an inlet located below the processor. This general arrangement of cutterhead, processor, and blower inlet is also disclosed in U.S Pat. No. 4,345,417, issued Aug. 24, 1982 in the name of Harold E. deBuhr, et al. In this patent an auger assembly is disposed rearwardly and below for receiving crushed crop material and conveying it to the blower inlet. A Hungarian Patent No. 182,033, issued May 23, 1978, also shows a self propelled forage harvester having an auger assembly disposed below a conditioner assembly. This Hungarian patent is directed to an arrangement for separating crop material that is to be processed from a stream of material that is being conveyed from a remote cutterhead.

Applicant is not aware of any prior art showing of a pull-type forage harvester in which a crop processor has been incorporated.

SUMMARY OF THE INVENTION

An important object of the present invention is to provide pull-type forage harvester apparatus with a simple and reliable crop processor assembly.

In pursuance of this and other important objects the present invention contemplates an improved pull-type forage harvester having a main frame supported on ground engaging wheels, a header mounted on and extending forwardly from the main frame, a cutting assembly comprising a cylindrical cutterhead including a plurality of knives having cutting edges rotating in a cylindrical path and a shearbar operatively associated with the knives for chopping crop material, feed means for receiving crop material from the header and conveying it to the cutting assembly, a blower remotely located on the main frame relative to the cutting assembly, the blower including inlet means and means for discharging chopped crop material via a spout to a collecting receptacle, and a transverse conveyor mounted on the main frame. The conveyor comprises an auger mounted in a trough for receiving chopped crop material from the cutterhead assembly and conveying it to the blower inlet. The improvement contemplates a crop processor assembly for crushing chopped crop material received from the cutting assembly and for expelling it to the transverse conveyor. More particularly, the improvement comprises a processor assembly comprising a pair of crushing rolls mounted adjacent the cutting assembly and above the transverse conveyor.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE INVENTION

Figure 1:
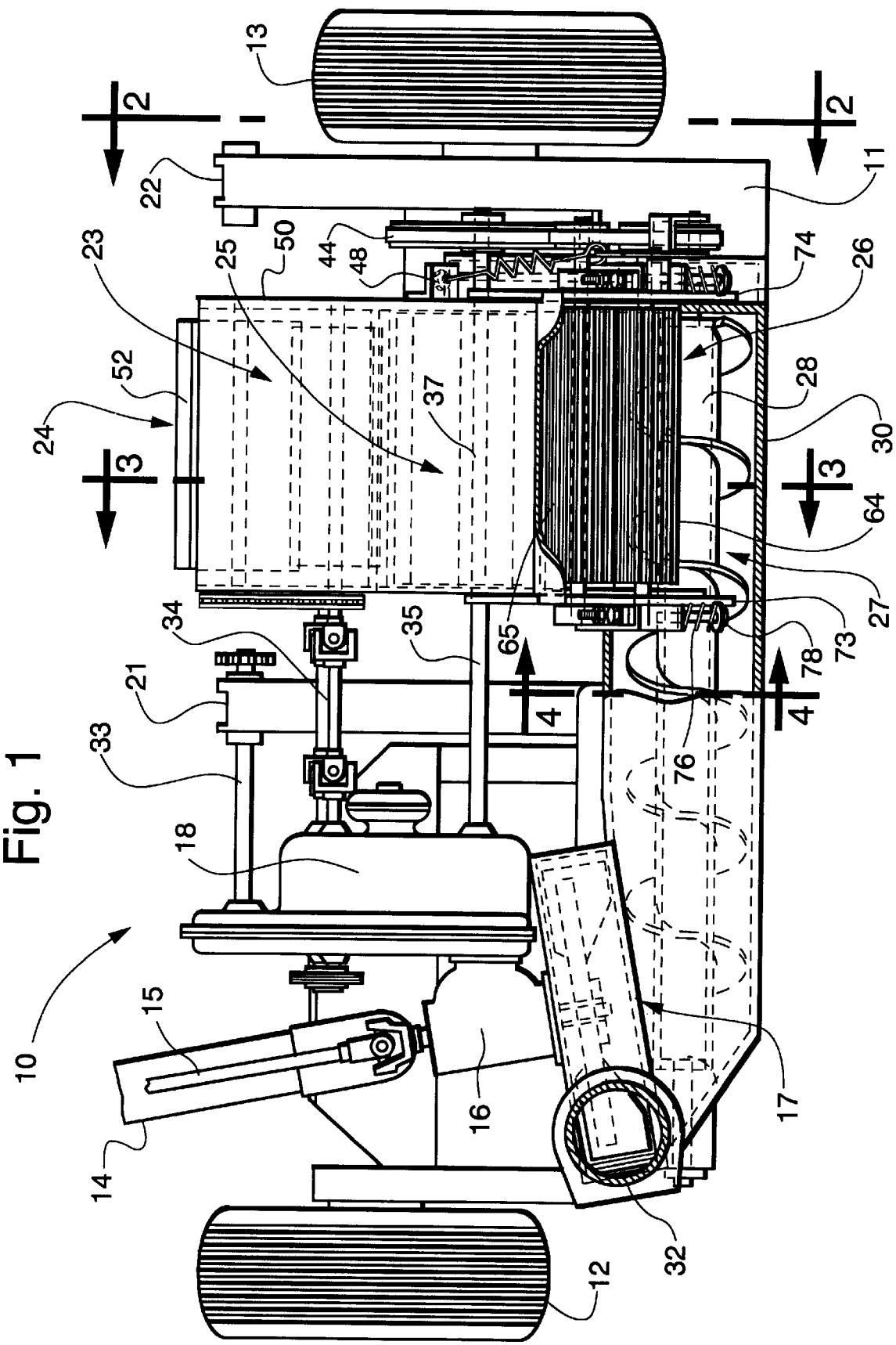
FIG. 1 is a diagrammatical plan view of a pull-type forage harvester with a cutaway portion showing the crop processor assembly of the present invention.

Referring now to the drawings for a more detailed description of the present invention, FIG. 1 shows diagrammatically a pull-type forage harvester base unit, generally designated by reference numeral 10, comprising a main frame 11 on which ground engaging wheels 12, 13 are mounted for transport via a tongue 14 adapted to be hitched to a tractor in a conventional manner. The tractor provides power via a PTO drive shaft 15 coupled to a main gear box 16 having output shafts for driving blower 17 and secondary gear box 18.

Figure 2:
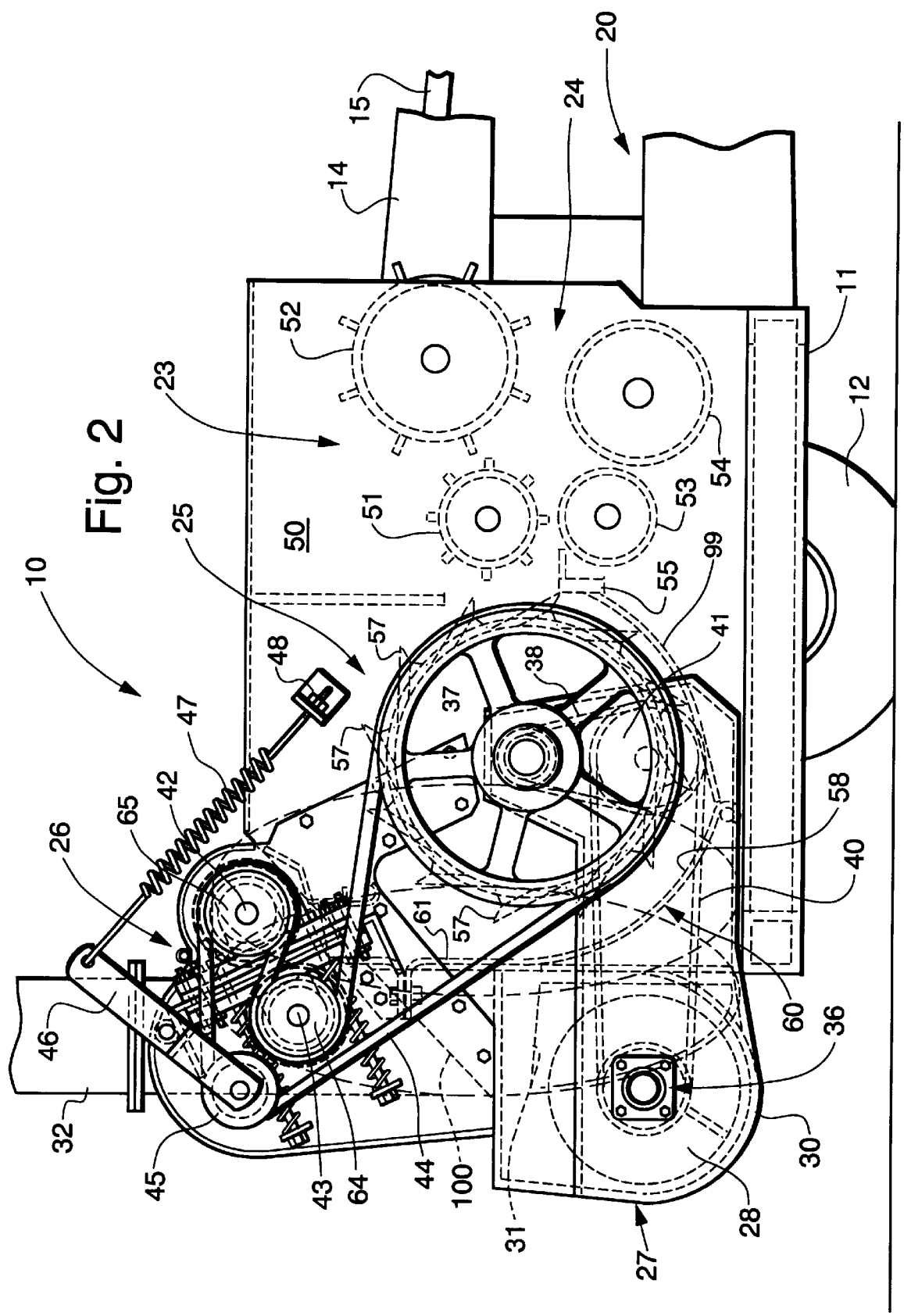
FIG. 2 is an elevational view showing a section taken along line 2—2 of FIG. 1.

A header, illustrated by reference numeral 20 in FIGS. 2 and 3, mounted to the main frame 11 at 21, 22, feeds crop material in a conventional manner to a feed roll assembly 23 through a forwardly located inlet 24. Material is fed via feed roll assembly 23 to a cutting assembly 25, which chops the crop material and throws it into a crop processor assembly 26. Chopped and processed crop material is collected in a transverse conveyor assembly 27, comprising an auger 28 rotatably mounted in trough 30, and conveyed to an inlet 31 (FIG. 2) in blower 17, where it is discharged via a spout 32 to a collecting receptacle, such as a wagon being towed behind the forage harvester. Secondary gear box 18 includes output shafts 33, 34, 35 for driving the header, the feedroll assembly and the cutterhead assembly, respectively.

Auger 28, journaled for rotation in bearing assembly 36, is rotated via a drive taken off cutterhead shaft 37, which drive includes belts 38 and 40 and intermediate sheave 41. Sheave 41, driven with cutterhead shaft 37, is coupled to crushing roll shafts 42, 43, via belt 44, held in tension by idler roll 45, pivotally mounted on arm 46, which is urged in a clockwise direction by tensioning spring 47 anchored to bracket 48 secured to sidewall 50.

For further description of the general structure and function of a forage harvester and particularly a prior art pull-type forage harvester, where crop processing was not available, reference is made to above mentioned U.S. Pat. Nos. 4,505,434, and 4,426,043, both of which are hereby incorporated by reference. The apparatus in these patents shows that it is common to feed chopped crop material directly from a cutterhead to the transverse auger, which in turn conveys it to a blower. The direct path from the cutterhead may include a recutter screen as shown in the '434 patent.

More specifically, the present invention comprises a base unit 10 that includes a pair of aggressive upper feed rolls 51, 52, cooperating with opposing lower feed rolls 53, 54 to feed a mat of crop material with a generally rectangular cross section across shearbar 55. A cylindrical cutterhead 56 comprising a plurality of transverse knives 57 rotates in a clockwise direction to bring the cutting edges of knives 57 in shearing relationship with shearbar 55, which presents a stationary cutting edge. As mentioned above, these feed roll and cutting assemblies are conventional. What is not conventional and is at the heart of applicant's invention is the utilization of crop processing assembly 26, which is mounted to receive crop material conveyed along an arcuate inner surface 58 of a diversion baffle 60, interposed between the cutterhead and the auger. Adjacent arcuate inner surface 58 is a contiguous flat surface portion 61 which guides chopped material upwardly through a throat area defined by walls 62, 63 to counter rotating crushing rolls 64, 65. The crushed material is discharged upwardly and rearwardly against arcuate portion 66 of guide plate 67 and then downwardly to the right end of auger assembly 27, which conveys it to blower 17 via inlet 31.

Figure 4:
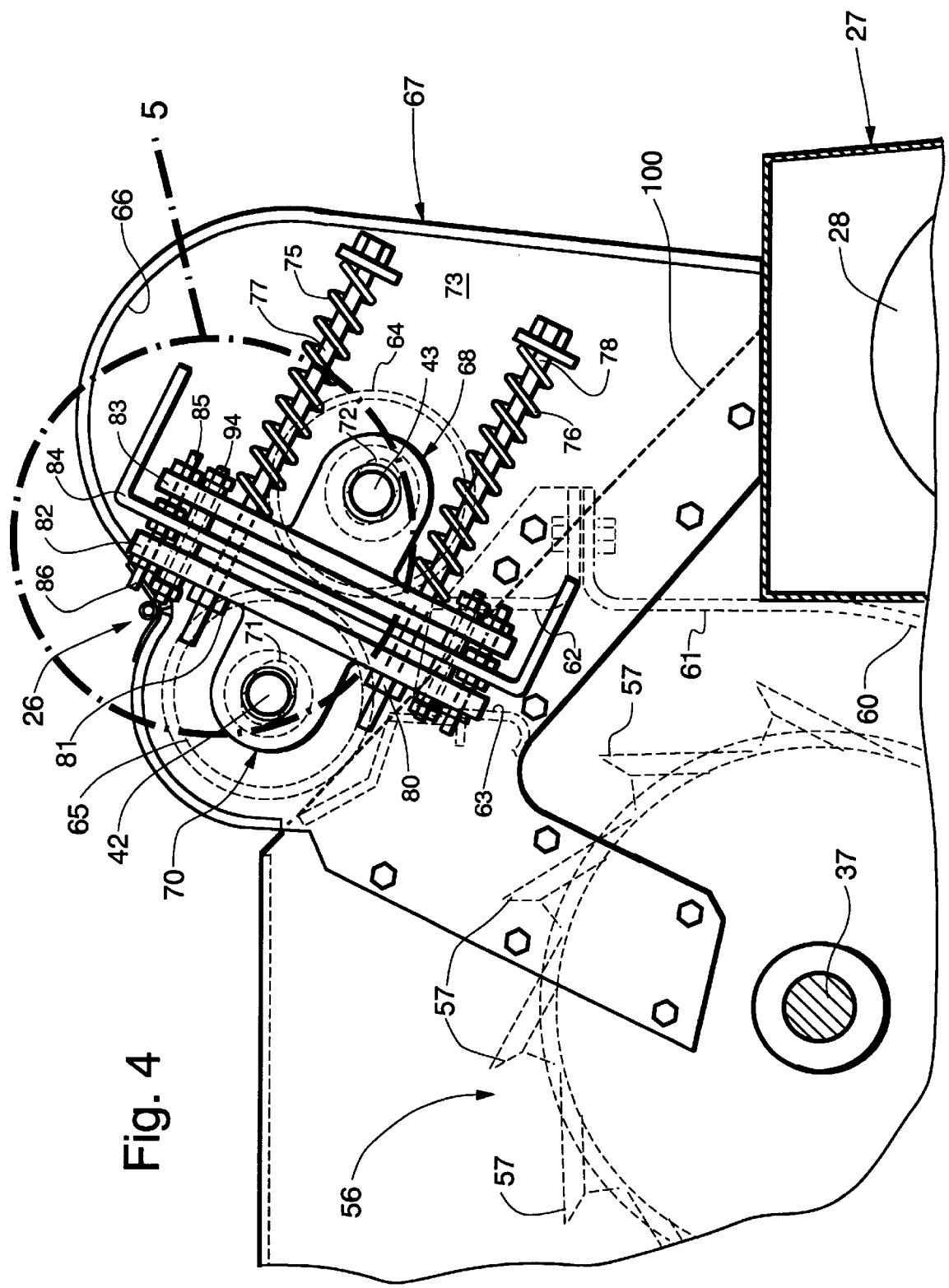
FIG. 4 is a partial elevational view showing a section taken along line 4—4 of FIG. 1.

Now turning to FIG. 4, crushing rolls 64, 65 of crop processor assembly 26 are mounted in two pairs of pillow block bearing assemblies. For the purpose of this description, reference is only made to upper and lower pillow block bearing assemblies 68, 70, shown mounted on the left side of the machine. Identical assemblies are mounted on the right side. Slots 71, 72 in sidewalls 73, 74 of crop processor assembly 26 accommodate shafts 42, 43 to permit the space between the crushing rolls to vary. Left and right pairs of compression springs 75, 76 (FIG. 4) associated with the ends of the rolls are mounted on bolts 77, 78 and secured in place by nuts 80, 81, to urge flanges 82, 83 of bearing assemblies 70, 68 toward a mounting bracket 84 which is affixed to side wall 73.

Figure 5:
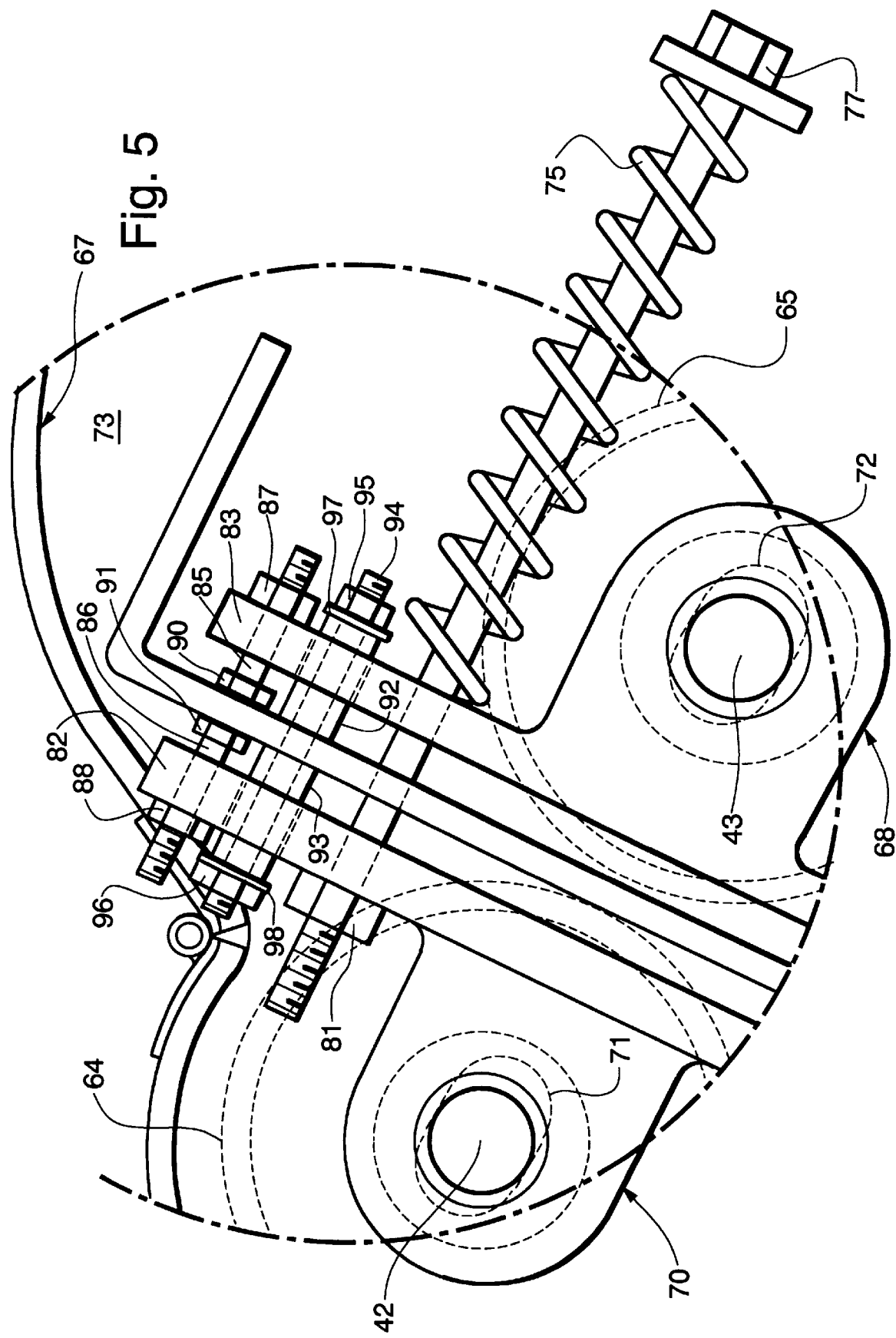
FIG. 5 is an enlarged elevational view showing the area designated by circular outline 5 of FIG. 4.

Referring now to FIG. 5, one end of the mounting arrangement for crushing rolls 64, 65 is shown in detail, whereby shafts 42, 43 are adjustable in slots 71, 72. One adjustment determines minimum spacing between the outer aggressive surfaces of crushing rolls 64, 65 and another adjustment sets variable limits for maximum spacing during operation. The area depicted in FIG. 5 shows elements that have like counterparts with like functions at the other end of the bearing assemblies.

Spacer bolts 85, 86 are secured by lock nuts 87, 88 in threaded holes in flanges 83, 82, respectively, whereupon the heads 90, 91 of the bolts are secured against mounting bracket 84. Thus, by varying the positions of bolts 85, 86 and lock nuts 87, 88 the spacing between flanges 82, 83 can be varied, which in turn adjusts the minimum spacing of shafts 42, 43. Maximum spacing is determined by spacers 92, 93, coaxial with element 94 and held in place by nuts 95, 96 tightened down against washers 97, 98. Spacers 92, 93 provide guidance via appropriate clearance holes in flanges 83, 82, which thereby permits movement of the bearing assemblies against the force of compression springs 75, 76 from the minimum spacing to maximum spacing which occurs when flanges 82, 83 engage stop washers 98, 97.

In operation feed rolls 51, 52, 53, 54 feed uncut crop material along a path to the top of shearbar 35 where it is engaged by knives 57 of cutterhead 56 and cut into small particles that are guided along a wall 99 and diversion baffle 60. Crushing rolls 64, 65 receive the chopped crop material, crack uncut kernels, and expel the chopped and crushed material against the arcuate potion of guide plate 67 to auger 28. Diversion baffle 60 is readily removable, in a manner similar to a recutter screen, in the event there is no need for the processing rolls. Further, the entire crop processing assembly is designed to be readily removable by deconnecting side walls 73, 74, lifting the assembly away, and replacing it with a flat access door secured to flat edges 100 (e.g., see FIG. 4) resulting in an auger assembly enclosed in a well known manner.

Figure 3:
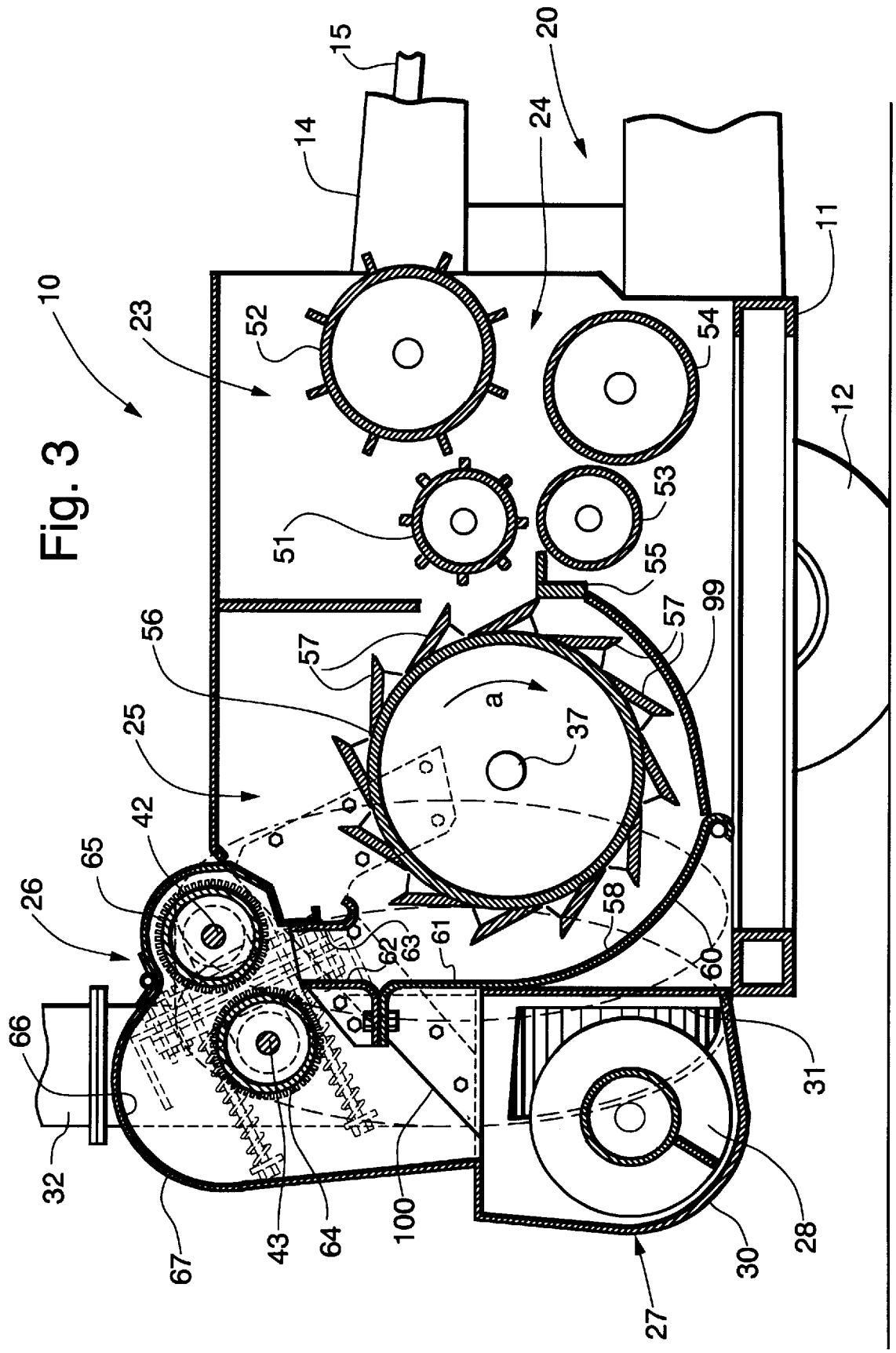
FIG. 3 is an elevational view showing a section taken along line 3—3 of FIG. 1.

Thus, as the cutterhead is rotated in direction a, see FIG. 3, the cutting edges of knives 57 generate a cylindrical path, which brings the knives in contact with crop material being fed across fixed shear bar 55 in a well known manner. The chopped material continues along wall 99 whereupon it is either delivered to the processing rolls and then to the cross auger of the present invention or, alternatively, the machine is modified and it is delivered directly to the auger if processing is not necessary.

Of the many implicit and explicit advantages of the present invention one of the most important is the provision of a unique combination for a pull-type forage harvester that is readily adaptable for converting prior art pull-type harvester to process chopped crop material in a manner not heretofore known.

While preferred structure in which the principles of the present invention is shown and described above, it is to be understood that the invention is not limited to such preferred structure, but that, in fact, widely different means of varying scope and configuration may be employed in the practice of the invention.

Having thus described the invention, what is claimed is:

1. In a pull type forage harvester comprising
   a main frame supported on ground engaging wheels,
   a header mounted on and extending forwardly from said main frame,
   a cutting assembly comprising a cylindrical cutterhead including an axis and a plurality of knives having cutting edges rotating in a cylindrical path about said axis, and a shearbar operatively associated with said knives for chopping crop material,
   feed means for receiving crop material from said header and conveying it to said cutting assembly,
   a blower remotely located on said main frame relative to said cutting assembly, said blower including inlet means and means for discharging chopped crop material via a spout to a collecting receptacle, and
   a transverse conveyor mounted on said main frame, said conveyor comprising an auger having an axis and spiral flighting, said auger mounted in a trough for receiving chopped crop material from said cutterhead assembly and conveying it to said blower inlet means, the improvement comprising
   a crop processor assembly for crushing chopped crop material received from said cutting assembly and expelling it to said transverse conveyor, said processor assembly comprising a pair of crushing rolls mounted adjacent said cutting assembly and above said transverse conveyor.

2. A pull type forage harvester as set forth in claim 1 wherein
   said crushing rolls are mounted above said cutting assembly with their axes substantially parallel to the axis of said cylindrical cutterhead, and
   said cutting assembly includes guide means for guiding chopped crop material along an uninterrupted path to said crushing rolls.

3. A pull type forage harvester as set forth in claim 2 wherein
   said crushing rolls are mounted above said transverse conveyor with their axes substantially parallel to the axis of said auger.

4. A pull type forage harvester as set forth in claim 2 wherein said processor assembly further comprises
   second guide means for guiding said crushed chopped crop material to said transverse conveyor.

5. A pull type forage harvester as set forth in claim 2 wherein
   said guide means comprise a plate interposed between said cutting assembly and said transverse conveyor, said plate includes an arcuate surface portion spaced generally rearwardly from said cylindrical path of said cutting edges of said knives for guiding said chopped crop material along an arcuate portion of said uninterrupted path.

6. A pull type forage harvester as set forth in claim 5 wherein
   said plate also includes a flat surface portion contiguous to said arcuate surface portion and extending generally vertical for receiving said chopped crop material from said arcuate surface and guiding it along a generally vertical portion of said uninterrupted path.

7. A pull type forage harvester as set forth in claim 4 wherein
   said second guide means includes a second plate mounted above and rearwardly of said processor assembly, said second plate includes a second arcuate portion in the path of said expelled crushed crop material for guiding it downwardly to said transverse conveyor.

8. A pull type forage harvester as set forth in claim 7 wherein
   said guide means comprise a plate interposed between said cutting assembly and said transverse conveyor, said plate includes an arcuate surface portion spaced generally rearwardly from said cylindrical path of said cutting edges of said knives for guiding said chopped crop material along an arcuate portion of said uninterrupted path.

9. A pull type forage harvester as set forth in claim 5 wherein
   said cutting assembly includes means for detachably securing said guide means to provide a direct path for chopped crop material from said cutting assembly to said transverse conveyor, under conditions where said guide means is detached and removed.

10. A pull type forage harvester as set forth in claim 9 wherein
    said crop processor assembly includes means for detachably mounting said pair of crushing rolls.

* * * * *